United States Patent
Lim et al.

(10) Patent No.: US 9,806,379 B2
(45) Date of Patent: *Oct. 31, 2017

(54) NON-AQUEOUS ELECTROLYTE SOLUTION AND LITHIUM SECONDARY BATTERY INCLUDING THE SAME

(71) Applicant: LG Chem, Ltd., Seoul (KR)

(72) Inventors: Young Min Lim, Daejeon (KR); Chul Haeng Lee, Daejeon (KR); Doo Kyung Yang, Daejeon (KR); Shul Kee Kim, Daejeon (KR)

(73) Assignee: LG Chem, Ltd. (KR)

( * ) Notice: Subject to any disclaimer, the term of this patent is extended or adjusted under 35 U.S.C. 154(b) by 485 days.

This patent is subject to a terminal disclaimer.

(21) Appl. No.: 14/448,155

(22) Filed: Jul. 31, 2014

(65) Prior Publication Data

US 2014/0349198 A1 Nov. 27, 2014

Related U.S. Application Data

(63) Continuation of application No. PCT/KR2014/004731, filed on May 27, 2014.

(30) Foreign Application Priority Data

May 27, 2013 (KR) .................. 10-2013-0059920

(51) Int. Cl.

| H01M 10/0569 | (2010.01) |
|---|---|
| H01M 4/62 | (2006.01) |
| H01M 10/0567 | (2010.01) |
| H01M 10/052 | (2010.01) |
| H01M 10/0568 | (2010.01) |
| H01M 4/505 | (2010.01) |
| H01M 4/525 | (2010.01) |

(52) U.S. Cl.
CPC ....... *H01M 10/0569* (2013.01); *H01M 4/623* (2013.01); *H01M 4/625* (2013.01); *H01M 10/052* (2013.01); *H01M 10/0567* (2013.01); *H01M 10/0568* (2013.01); *H01M 4/505* (2013.01); *H01M 4/525* (2013.01); *H01M 2300/0037* (2013.01); *Y02E 60/122* (2013.01); *Y02T 10/7011* (2013.01)

(58) Field of Classification Search
CPC ......... H01M 10/0569; H01M 10/0568; H01M 10/0567; H01M 10/052; H01M 4/623; H01M 4/625; H01M 4/505; H01M 4/525; H01M 2300/0037; Y02E 60/122
See application file for complete search history.

(56) References Cited

U.S. PATENT DOCUMENTS

| 2004/0106047 | A1 | 6/2004 | Mie et al. |
| 2008/0057403 | A1 | 3/2008 | Issaev et al. |
| 2012/0100434 | A1 | 4/2012 | Jouanneau-Si Larbi et al. |
| 2012/0164519 | A1 | 6/2012 | Lee et al. |
| 2012/0214073 | A1 | 8/2012 | Iwaya et al. |
| 2012/0258357 | A1 | 10/2012 | Kim |
| 2012/0316716 | A1 | 12/2012 | Odani et al. |
| 2013/0029230 | A1 | 1/2013 | Park et al. |
| 2013/0084493 | A1 | 4/2013 | Tokuda |

FOREIGN PATENT DOCUMENTS

| CN | 1497765 | A | 5/2004 |
| CN | 101512804 | A | 8/2009 |
| CN | 102074734 | A | 5/2011 |
| CN | 102544570 | A | 7/2012 |
| CN | 102952099 | * | 3/2013 |
| CN | 102952099 | A | 3/2013 |
| CN | 104011927 | A | 8/2014 |
| JP | 2004-165151 | A | 6/2004 |
| JP | 2009-187698 | A | 8/2009 |
| JP | 2012533163 | A | 12/2012 |
| JP | 2013016456 | A | 1/2013 |
| JP | 2013084592 | A | 5/2013 |
| KR | 2009-0039211 | A | 4/2009 |
| KR | 20090107436 | A | 10/2009 |
| KR | 2012-0035638 | A | 4/2012 |
| KR | 2012-0090755 | A | 8/2012 |
| KR | 20120090969 | A | 8/2012 |
| KR | 20120115839 | A | 10/2012 |
| WO | 2011052605 | A1 | 5/2011 |

OTHER PUBLICATIONS

The Committee of Battery Technology, the Electrochemical Society of Japan, Battery Handbook, OHM Electric Co., Ltd., Feb. 10, 2010, Edition 1, Issue 3, pp. 533-546. (Partial English translation attached.)
Supplemental Search Report from European Appln. No. 14 79 5932, dated Apr. 15, 2015.
International Search Report from PCT/KR2014/004731 dated Sep. 2, 2014.
Search Report from Office Action dated Jan. 4, 2017 in Chinese Application No. 201480001987.7.
Yuping Wu et al., Lithium Ion Batteries—Application and Practice, Chemical Industry Press, Dec. 31, 2011, 6 pages (Table 10-1 and p. 217).
Chinese Search Report for Application No. 201480001987.7 dated Jul. 4, 2017, 2 pages.

* cited by examiner

*Primary Examiner* — Laura Weiner
(74) *Attorney, Agent, or Firm* — Lerner, David, Littenberg, Krumholz & Mentlik, LLP (57) ABSTRACT

Provided are a non-aqueous electrolyte solution, which includes a non-aqueous organic solvent including propylene carbonate (PC) and an ester-based solvent, and lithium bis(fluorosulfonyl)imide (LiFSI), and a lithium secondary battery including the non-aqueous electrolyte solution.
According to the non-aqueous electrolyte solution of the present invention, since a robust solid electrolyte interface (SEI) may be formed on an anode during initial charge of a lithium secondary battery including the non-aqueous electrolyte solution, high-temperature cycle characteristics and capacity characteristics after high-temperature storage as well as low-temperature, room temperature, and high-temperature output characteristics may be simultaneously improved.

12 Claims, 6 Drawing Sheets

NON-AQUEOUS ELECTROLYTE SOLUTION AND LITHIUM SECONDARY BATTERY INCLUDING THE SAME

CROSS-REFERENCE TO RELATED APPLICATIONS

The present application is a continuation of International Application No. PCT/KR2014/004731 filed on May 27, 2014, which claims the benefit of Korean Patent Application No. 10-2013-0059920, filed on May 27, 2013, the disclosures of which are incorporated herein by reference.

TECHNICAL FIELD

The present invention relates to a non-aqueous electrolyte solution which includes a non-aqueous organic solvent including propylene carbonate (PC) and an ester-based solvent; and lithium bis(fluorosulfonyl)imide (LiFSI), and a lithium secondary battery including the non-aqueous electrolyte solution.

BACKGROUND ART

Demand for secondary batteries as an energy source has been significantly increased as technology development and demand with respect to mobile devices have increased. Among these secondary batteries, lithium secondary batteries having high energy density and high voltage have been commercialized and widely used.

A lithium metal oxide is used as a cathode active material of a lithium secondary battery, and lithium metal, a lithium alloy, crystalline or amorphous carbon, or a carbon composite is used as an anode active material. A current collector may be coated with the active material of appropriate thickness and length or the active material itself may be coated in the form of a film, and the resultant product is then wound or stacked with an insulating separator to prepare an electrode group. Thereafter, the electrode group is put into a can or a container similar thereto, and a secondary battery is then prepared by injecting an electrolyte solution.

Charge and discharge of the lithium secondary battery is performed while a process of intercalating and deintercalating lithium ions from a lithium metal oxide cathode into and out of a graphite anode is repeated. In this case, since lithium is highly reactive, lithium reacts with the carbon electrode to form $Li_2CO_3$, LiO, or LiOH. Thus, a film may be formed on the surface of the anode. The film is denoted as "solid electrolyte interface (SEI)", wherein the SEI formed at an initial stage of charging may prevent a reaction of the lithium ions with the carbon anode or other materials during charge and discharge. Also, the SEI may only pass the lithium ions by acting as an ion tunnel. The ion tunnel may prevent the destruction of a structure of the carbon anode due to the co-intercalation of the carbon anode and organic solvents of an electrolyte solution having a high molecular weight which solvates lithium ions and moves therewith.

Therefore, in order to improve high-temperature cycle characteristics and low-temperature output of the lithium secondary battery, a robust SEI must be formed on the anode of the lithium secondary battery. When the SEI is once formed during the first charge, the SEI may prevent the reaction of the lithium ions with the anode or other materials during repeated charge and discharge cycles caused by the subsequent use of the battery, and the SEI may act as an ion tunnel that only passes the lithium ions between the electrolyte solution and the anode.

Typically, with respect to an electrolyte solution which does not include an electrolyte solution additive or includes a non-aqueous organic solvent or electrolyte solution additive having poor characteristics, the improvement of low-temperature output characteristics may be difficult to expect due to the formation of a non-uniform SEI. In particular, in a case where a type or addition amount of a non-aqueous organic solvent, electrolyte solution additive or lithium salt that are included in the electrolyte solution is not adjusted to the required amount, the surface of a cathode may be decomposed during a high-temperature reaction or the electrolyte solution may cause an oxidation reaction, and eventually, irreversible capacity of a secondary battery may increase and output characteristics may be reduced.

Thus, an ester-based solvent was used to improve the output characteristics of the secondary battery. However, in this case, although the output characteristics were improved, there was a limitation that high-temperature characteristics as much as those of a typical lithium secondary battery may be difficult to be maintained due to material properties of the ester-based solvent.

DISCLOSURE OF THE INVENTION

Technical Problem

The present invention provides a non-aqueous electrolyte solution which may improve high-temperature cycle characteristics and capacity characteristics after high-temperature storage, as well as low-temperature, room temperature, and high-temperature output characteristics, and a lithium secondary battery including the same.

Technical Solution

According to an aspect of the present invention, there is provided a non-aqueous electrolyte solution including: i) a non-aqueous organic solvent including propylene carbonate (PC) and an ester-based solvent; and ii) lithium bis(fluorosulfonyl)imide (LiFSI).

According to another aspect of the present invention, there is provided a lithium secondary battery including: a cathode; an anode; a separator disposed between the cathode and the anode; and the non-aqueous electrolyte solution.

Advantageous Effects

According to a non-aqueous electrolyte solution of the present invention, since a robust solid electrolyte interface (SEI) may be formed on an anode during initial charge of a lithium secondary battery including the non-aqueous electrolyte solution, high-temperature cycle characteristics and capacity characteristics after high-temperature storage as well as low-temperature, room temperature, and high-temperature output characteristics may be simultaneously improved.

MODE FOR CARRYING OUT THE INVENTION

Hereinafter, the present invention will be described in more detail to allow for a clearer understanding of the present invention. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A non-aqueous electrolyte solution according to an embodiment of the present invention may include a non-aqueous organic solvent including propylene carbonate (PC) and an ester-based solvent; and lithium bis(fluorosulfonyl)imide (LiFSI).

According to an embodiment of the present invention, in a case where lithium bis(fluorosulfonyl)imide is used in combination with the non-aqueous organic solvent including propylene carbonate (PC) and an ester-based solvent, since a solid SEI layer is formed on an anode during initial charge, initial output characteristics, low-temperature output characteristics, and high-temperature output characteristics may not only be improved, but also the decomposition of the surface of a cathode, which may occur during high-temperature cycles at 45° C. or more, may be suppressed and an oxidation reaction of an electrolyte solution may be prevented. Thus, capacity characteristics of a secondary battery may be simultaneously improved.

In general, since an ester-based solvent may have a lower freezing point than other carbonate-based solvents and may have excellent viscosity and permittivity at low temperature, the ester-based solvent has advantages in that it may reduce the resistance of a lithium secondary battery at low temperature and may improve output characteristics as well as initial room temperature output characteristics when the ester-based solvent is used in the battery. However, since the ester-based solvent has a low freezing point, high-temperature battery characteristics as much as those of a typical lithium secondary battery may be difficult to be maintained.

Propylene carbonate has advantages in that it may exceptionally act as an electrolyte while having a wider temperature range than other carbonate-based solvents.

Thus, in the present invention, excellent output characteristics at low temperature or room temperature, i.e., the advantages of the ester-based solvent, are maintained, and the limitations related to the high-temperature characteristics of the ester-based solvent may be addressed by using the ester-based solvent in combination with the propylene carbonate.

However, in a case where propylene carbonate is used with a lithium salt, such as $LiPF_6$, as a solvent, an enormous amount of irreversible reactions may occur during a process of forming the SEI in a lithium secondary battery using a carbon electrode and a process of intercalating lithium ions, which are solvated by the propylene carbonate, between carbon layers. This may cause the degradation of the battery performance such as high-temperature cycle characteristics.

Also, when the lithium ions solvated by the propylene carbonate are intercalated into the carbon layers constituting the anode, exfoliation of a carbon surface layer may proceed. The exfoliation may occur because gas, which is generated when the solvent decomposes between the carbon layers, causes a large distortion in the carbon layers. The exfoliation of the surface layer and the decomposition of the electrolyte solution may continuously proceed. As a result, since an effective SEI may not be formed when the electrolyte solution including propylene carbonate is used in combination with a carbon-based anode material, lithium ions may not be intercalated.

In the present invention, the above-described limitations, which occur when the propylene carbonate and the lithium salt, such as $LiPF_6$, are used together, may be addressed by using lithium bis(fluorosulfonyl)imide in combination therewith.

Since the lithium bis(fluorosulfonyl)imide, as a lithium salt, is added to a non-aqueous electrolyte solution to form a robust and stable SEI on an anode, the lithium bis(fluorosulfonyl)imide may improve low-temperature output characteristics. Also, the lithium bis(fluorosulfonyl)imide may suppress the decomposition of the surface of the cathode, which may occur during high-temperature cycles, and may prevent the oxidation reaction of the electrolyte solution.

According to an embodiment of the present invention, a mixing ratio of the propylene carbonate to the ester-based solvent, as the non-aqueous organic solvent, may significantly affect the improvement of initial room temperature, low-temperature, and high-temperature output characteristics as well as capacity characteristics after high-temperature storage.

The mixing ratio of the propylene carbonate to the ester-based solvent is in a range of 1:0.5 to 1:4, preferably, in a range of 1:1 to 1:3.5, and more preferably, in a range of 1:1 to 1:2.5. In the case that the above range of the mixing ratio is satisfied, a synergistic effect due to the mixing of the two non-aqueous organic solvents may be obtained.

In the case that the amount of the propylene carbonate added is less than the above range, since gas may be continuously generated due to the decomposition of the surface of the cathode during the high-temperature cycles, a swelling phenomenon may occur in which a thickness of the battery increases. In the case in which the amount of the propylene carbonate is greater than the above range, a robust SEI may be difficult to be formed on the anode during the initial charge.

In the non-aqueous organic solvent according to an embodiment of the present invention, the ester-based solvent may be included in an amount of 10 parts by weight to 70 parts by weight, for example, 20 parts by weight to 50 parts by weight based on 100 parts by weight of the non-aqueous organic solvent.

In the case that the amount of the added ester-based solvent is greater than 70 parts by weight, high-temperature performance may degrade, and in the case in which the amount of the added ester-based solvent is less than 10 parts by weight, it is not desirable because effects, such as targeted initial room temperature output characteristics and low-temperature output characteristics, may not be sufficiently obtained.

According to an embodiment of the present invention, within the above amount of the ester-based solvent included, an optimum effect on capacity characteristics after high-temperature storage as well as room temperature, low-temperature, and high-temperature output characteristics of the lithium secondary battery of the present invention may be achieved by appropriately adjusting the amount of the propylene carbonate within the range of the mixing ratio.

In the non-aqueous organic solvent according to the embodiment of the present invention, examples of the ester-based solvent may be any one selected from the group consisting of methyl formate, methyl acetate, ethyl acetate, isopropyl acetate, isoamyl acetate, methyl propionate, ethyl propionate, methyl butylate, and ethyl butylate, or a mixture of two or more thereof. Among these materials, the ester-based solvent may include methyl propionate, ethyl propionate, or a mixed solvent thereof, and for example, may include ethyl propionate.

Also, a non-aqueous organic solvent, which may be further included in the non-aqueous electrolyte solution in addition to the ester-based solvent and propylene carbonate, is not limited as long as it may minimize the decomposition due to the oxidation reaction during charge and discharge of the battery and may exhibit desired characteristics with additives.

The non-aqueous organic solvent, which may be further included in the non-aqueous electrolyte solution according to an embodiment of the present invention, for example, may further include any one selected from the group consisting of butylene carbonate (BC), dimethyl carbonate (DMC), diethyl carbonate (DEC), dipropyl carbonate (DPC), ethylmethyl carbonate (EMC), methylpropyl carbonate (MPC), and ethylpropyl carbonate (EPC), or a mixture of two or more thereof.

According to an embodiment of the present invention, a concentration of the lithium bis(fluorosulfonyl)imide in the non-aqueous electrolyte solution may be in a range of 0.1 mole/l to 2 mole/l, preferably, 0.5 mole/l to 1.5 mole/l. In the case that the concentration of the lithium bis(fluorosulfonyl)imide is less than 0.1 mole/l, effects of improving the low-temperature output and high-temperature cycle characteristics of the battery may be insignificant. In the case in which the concentration of the lithium bis(fluorosulfonyl)imide is greater than 2 mole/l, side reactions in the electrolyte solution may excessively occur during the charge and discharge of the battery, and thus, the swelling phenomenon may occur.

In order to further prevent the side reactions, the non-aqueous electrolyte solution of the present invention may further include a lithium salt. Any lithium salt typically used in the art may be used as the lithium salt. For example, the lithium salt may include any one selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, and $LiC_4BO_8$, or a mixture of two or more thereof.

A mixing ratio of the lithium salt to the lithium bis(fluorosulfonyl)imide may be in a range of 1:1 to 1:9 as a molar ratio. In the case that the mixing ratio of the lithium salt to the lithium bis(fluorosulfonyl)imide is outside the range of the molar ratio, the side reactions may excessively occur in the electrolyte solution during the charge and discharge of the battery, and thus, the swelling phenomenon may occur.

In particular, the mixing ratio of the lithium salt to the lithium bis(fluorosulfonyl)imide may be in a range of 1:6 to 1:9 as a molar ratio. Specifically, in the case in which the mixing ratio of the lithium salt to the lithium bis(fluorosulfonyl)imide is less than 1:6 as a molar ratio, the enormous amount of irreversible reactions may occur during the process of forming the SEI in the lithium-ion battery and the process of intercalating lithium ions, which are solvated by the propylene carbonate and ethylene carbonate, into the anode, and the effects of improving the low-temperature output, cycle characteristics after high-temperature storage, and capacity characteristics after high-temperature storage of the secondary battery may be insignificant due to the exfoliation of an anode surface layer (e.g., carbon surface layer) and the decomposition of the electrolyte solution.

The non-aqueous electrolyte solution according to the embodiment of the present invention may further include at least one compound selected from the group consisting of $LiBF_4$, lithium oxalyldifluoroborate (LiODFB), and ethylene sulfate (ES), as an additive. Also, for example, the non-aqueous electrolyte solution may include two or more compounds selected from the group consisting of $LiBF_4$, LiODFB, and ES. The additive may prevent a side reaction in the electrolyte solution during the charge and discharge of the lithium secondary battery including an excessive amount of lithium bis(fluorosulfonyl)imide at room temperature. Accordingly, the additive may effectively improve cycle characteristics of the battery at room temperature. In this case, an amount of each additive may be in a range of 0.01 wt % to 5 wt % based on the total weight of the electrolyte solution.

A lithium secondary battery according to an embodiment of the present invention may include a cathode including a cathode active material; an anode including an anode active material; a separator disposed between the cathode and the anode; and the non-aqueous electrolyte solution.

Herein, the cathode active material may include a manganese spinel-based active material, lithium metal oxide, or a mixture thereof. Furthermore, the lithium metal oxide may be selected from the group consisting of lithium-nickel-manganese-cobalt-based oxide, lithium-manganese-based oxide, lithium-nickel-manganese-based oxide, and lithium-manganese-cobalt-based oxide, and for example, may include $LiCoO_2$, $LiNiO_2$, $LiMnO_2$, $LiMn_2O_4$, $Li(Ni_aCo_bMn_c)O_2$ (where $0<a<1$, $0<b<1$, $0<c<1$, and $a+b+c=1$), $LiNi_{1-Y}Co_YO_2$, $LiCo_{1-Y}Mn_YO_2$, $LiNi_{1-Y}Mn_YO_2$ (where $0 \leq Y<1$), $Li(Ni_aCo_bMn_c)O_4$ (where $0<a<2$, $0<b<2$, $0<c<2$, and $a+b+c=2$), $LiMn_{2-z}Ni_zO_4$, and $LiMn_{2-z}Co_zO_4$ (where $0<z<2$).

As the anode active material, a carbon-based anode active material, such as crystalline carbon, amorphous carbon, or a carbon composite, may be used alone or in combination of two or more thereof. For example, the anode active material may include graphitic carbon, such as natural graphite and artificial graphite, as the crystalline carbon.

Specifically, in a lithium secondary battery, a slurry is prepared by mixing a predetermined solvent with a mixture of a cathode or anode active material, a conductive agent, and a binder, and the cathode or anode, for example, may then be prepared by coating a cathode or anode collector with the slurry and drying.

According to an embodiment of the present invention, the cathode collector is generally fabricated to have a thickness of 3 µm to 500 µm. The cathode collector is not particularly limited so long as it has high conductivity without causing adverse chemical changes in the batteries. The cathode collector may be formed of, for example, stainless steel, aluminum, nickel, titanium, fired carbon, or aluminum or stainless steel that is surface-treated with one of carbon, nickel, titanium, silver, or the like.

The cathode collector may have an uneven surface to improve the bonding strength of a cathode active material and may have any of various shapes such as a film, a sheet, a foil, a net, a porous body, a foam body, a non-woven fabric body, and the like.

The anode collector is generally fabricated to have a thickness of 3 µm to 500 µm. The anode collector is not particularly limited so long as it has conductivity without causing adverse chemical changes in the batteries. The anode collector may be formed of, for example, copper, stainless steel, aluminum, nickel, titanium, fired carbon, copper or stainless steel that is surface-treated with one of carbon, nickel, titanium, silver, or the like, an aluminum-cadmium alloy, or the like. Also, like the cathode collector, the anode collector may have a fine roughness surface to improve bonding strength of an anode active material. The anode collector may have various shapes such as a film, a sheet, a foil, a net, a porous body, a foam body, a non-woven fabric body, and the like.

The conductive agent used in the cathode or anode slurry is typically added in an amount of 1 wt % to 20 wt % based on the total weight of the mixture including the cathode or anode active material. Any conductive agent may be used without particular limitation so long as it has suitable conductivity without causing adverse chemical changes in the batteries. For example, the conductive agent may include a conductive material such as: graphite such as natural graphite and artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive oxide such as titanium oxide; or polyphenylene derivatives.

The binder is a component that assists the binding between the cathode or anode active material and the conductive agent, and the binding with the current collector. The binder is typically added in an amount of 1 wt % to 20 wt % based on the total weight of the compound including the cathode or anode active material. Examples of the binder may include various types of binder polymers, such as a polyvinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluorine rubber, and various copolymers.

Also, preferred examples of the solvent may include dimethyl sulfoxide (DMSO), alcohol, N-methyl pyrrolidone (NMP), acetone, or water, and the solvent is removed in a drying process.

A typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used. However, the present invention is not limited thereto.

Any battery case typically used in the art may be selected as a battery case used in the present invention. A shape of the battery case according to the use of the battery is not limited, and for example, a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells. Preferred examples of the medium and large sized device may be an electric vehicle, a hybrid electric vehicle, a plug-in hybrid electric vehicle, or a power storage system, but the medium and large sized device is not limited thereto.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Hereinafter, the present invention will be described in more detail, according to examples and experimental examples. However, the present invention is not limited thereto.

Example 1

[Preparation of Non-Aqueous Electrolyte Solution]

A non-aqueous electrolyte solution was prepared by adding 0.1 mole/l of $LiPF_6$ and 0.9 mole/l of lithium bis(fluorosulfonyl)imide based on a total weight of the non-aqueous electrolyte solution to a non-aqueous organic solvent having a composition in which a weight ratio of propylene carbonate (PC):ethyl propionate (EP):dimethyl carbonate (DMC) was 2:4:4.

[Preparation of Lithium Secondary Battery]

A cathode mixture slurry was prepared by adding 89 wt % of $Li(Ni_{0.33}CO_{0.33}Mn_{0.33})O_2$ as a cathode active material, 8 wt % of carbon black as a conductive agent, and 3 wt % of polyvinylidene fluoride (PVdF) as a binder to N-methyl-2-pyrrolidone (NMP) as a solvent. An about 20 µm thick aluminum (Al) thin film as a cathode collector was coated with the cathode mixture slurry and dried, and the Al thin film was then roll-pressed to prepare a cathode.

Also, an anode mixture slurry was prepared by adding 97 wt % of carbon powder as an anode active material, 2 wt % of PVdF as a binder, and 1 wt % of carbon black as a conductive agent to NMP as a solvent. A 10 µm thick copper (Cu) thin film as an anode collector was coated with the anode mixture slurry and dried, and the Cu thin film was then roll-pressed to prepare an anode.

A polymer type battery was prepared by a typical method using a polyolefin separator with the cathode and anode thus prepared, and the preparation of a lithium secondary battery was then completed by injecting the prepared non-aqueous electrolyte solution.

Example 2

A non-aqueous electrolyte solution and a lithium secondary battery were prepared in the same manner as in Example 1 except that 0.14 mole/l of $LiPF_6$ and 0.86 mole/l of lithium bis(fluorosulfonyl)imide (molar ratio of about 1:6) based on a total weight of the non-aqueous electrolyte solution were used as a lithium salt.

Example 3

A non-aqueous electrolyte solution and a lithium secondary battery were prepared in the same manner as in Example 1 except that 0.17 mole/l of $LiPF_6$ and 0.83 mole/l of lithium bis(fluorosulfonyl)imide (molar ratio of about 1:5) were used.

Comparative Example 1

A non-aqueous electrolyte solution and a lithium secondary battery were prepared in the same manner as in Example 1 except that a non-aqueous organic solvent having a composition was used in which a weight ratio of propylene carbonate (PC):ethylmethyl carbonate (EMC):dimethyl carbonate (DMC) was 3:3:4.

Comparative Example 2

A non-aqueous electrolyte solution and a lithium secondary battery were prepared in the same manner as in Example 1 except that a non-aqueous organic solvent having a composition was used in which a weight ratio of ethylene carbonate (EC):ethylmethyl carbonate (EMC):dimethyl carbonate (DMC) was 3:3:4.

Comparative Example 3

A non-aqueous electrolyte solution and a lithium secondary battery were prepared in the same manner as in Example 1 except that $LiPF_6$ was used alone as a lithium salt.

Comparative Example 4

A non-aqueous electrolyte solution and a lithium secondary battery were prepared in the same manner as in Example 1 except that $LiPF_6$ and lithium bis(fluorosulfonyl)imide were used at a molar ratio of about 1:0.5.

Experimental Example 1

<Low-Temperature Output Characteristics Test According to Molar Ratio of $LiPF_6$ to LiFSI>

Low-temperature outputs were calculated from voltage differences which were obtained by discharging the lithium secondary batteries of Examples 1 to 3 and Comparative Examples 1, 3, and 4 at 0.5 C for 10 seconds for the state of charge (SOC) at −30° C. The results thereof are presented in FIG. 1.

Figure 1:
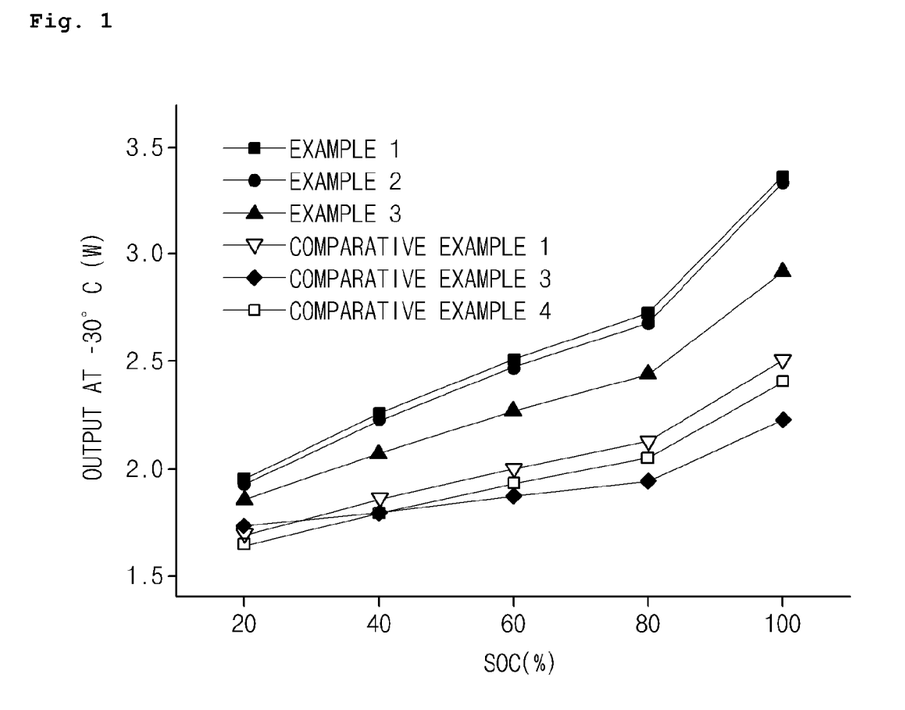
FIG. 1 is a graph illustrating the results of the measurement of low-temperature (−30° C.) output characteristics of lithium secondary batteries of Examples 1 to 3 and Comparative Examples 1, 3, and 4 according to Experimental Example 1.

Referring to FIG. 1, in a case where a molar ratio of $LiPF_6$ to lithium bis(fluorosulfonyl)imide (LiFSI) is 1:5 to 1:9 when the SOC was 100%, it may be understood that low-temperature output characteristics were significantly improved in comparison to Comparative Example 4 having the molar ratio of 1:0.5 and Comparative Example 3 in which LIFSI was not used but $LiPF_6$ was used alone. In particular, it may be understood that that the low-temperature output characteristics were improved as the amount of LiFSI increased.

Specifically, with respect to Example 1 in which the molar ratio of $LiPF_6$ to LiFSI is 1:9, it may be understood that the low-temperature output characteristics were improved by about 40% or more in comparison to those of Comparative Example 4 having the molar ratio of 1:0.5 and were improved by 60% or more in comparison to those of Comparative Example 3 in the case that the SOC was 100%. Similarly, in a case where the SOC was 20%, 40%, 60%, and 80%, excellent results may be obtained similar to the case in which the SOC was 100%.

When comparing Example 2, in which the molar ratio of $LiPF_6$ to LiFSI is 1:6, with Example 3 having the molar ratio of 1:5, it may be understood that despite the fact that the difference in the molar ratios was only 1, low-temperature output characteristics of Example 2 were significantly different from those of Example 3 in consideration of an increase in the amount of LIFSI in Example 3.

Therefore, it may be confirmed that the low-temperature output characteristics of the lithium secondary battery may be improved by adjusting the molar ratio of $LiPF_6$ to LiFSI.

Experimental Example 2

<High-Temperature Cycle Characteristics Test of Lithium Secondary Battery>

The lithium secondary batteries of Examples 1 to 3 and Comparative Examples 1, 3, and 4 were charged at 1 C to 4.2 V/38 mA at 45° C. under a constant current/constant voltage (CC/CV) condition and then discharged at a constant current (CC) of 3 C to a voltage of 3.03 V to measure discharge capacities. The charge and discharge were repeated 1 to 1,000 cycles and the measured discharge capacities are presented in FIG. 2.

Figure 2:
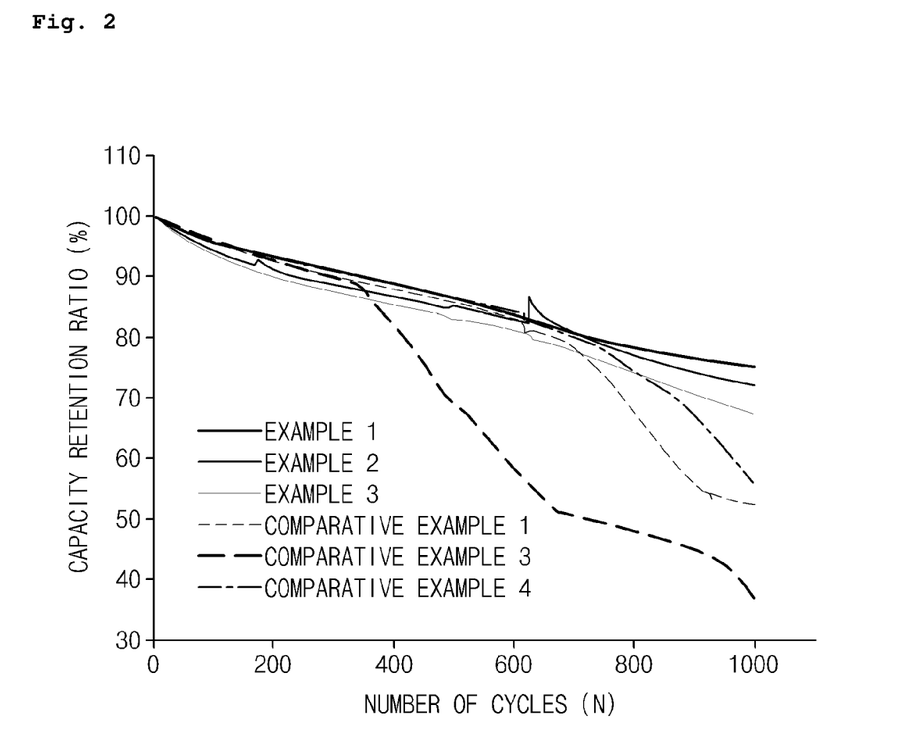
FIG. 2 is a graph illustrating the results of the measurement of high-temperature (45° C.) cycle characteristics of lithium secondary batteries of Examples 1 to 3 and Comparative Examples 1, 3, and 4 according to Experimental Example 2.

Referring to FIG. 2, with respect to high-temperature cycle characteristics, the lithium secondary batteries of Examples 1 to 3 initially exhibited capacity retention ratios similar to those of Comparative Examples 1, 3, and 4 to a $250^{th}$ cycle. The capacity retention ratios of Examples 1 to 3 were significantly different from those of Comparative Examples 1, 3, and 4 as the number of cycles increased, in particular, after a $700^{th}$ cycle.

Also, in a $1,000^{th}$ cycle, it may be understood that the capacity retention ratios of Example 1 and 2 were improved by about 40% or more in comparison to that of Comparative Examples 1, were improved by about 35% or more in comparison to that of Comparative Example 4, and were improved by about 100% or more in comparison to that of Comparative Example 3.

When comparing Example 2, in which the molar ratio of $LiPF_6$ to LiFSI is 1:6, with Example 3 having the molar ratio of 1:5, it may be understood that despite the fact that the difference in the molar ratios was only 1, high-temperature cycle characteristics of Example 2 were significantly different from those of Example 3 in consideration of the increase in the amount of LIFSI in Example 3.

Therefore, it may be confirmed that the high-temperature cycle characteristics of the lithium secondary battery may be improved by adjusting the molar ratio of $LiPF_6$ to LiFSI.

Experimental Example 3

<Output Characteristics Test after High-Temperature Storage According to Molar Ratio of $LiPF_6$ to LiFSI>

The lithium secondary batteries of Examples 1 to 3 and Comparative Examples 1, 3, and 4 were stored at 60° C. and then charged at 1 C to 4.2 V/38 mA under a CC/CV condition. Then, the lithium secondary batteries were discharged at a CC of 1 C to a voltage of 3.0 V to measure discharge capacities. The results thereof are presented in FIG. 3.

Figure 3:
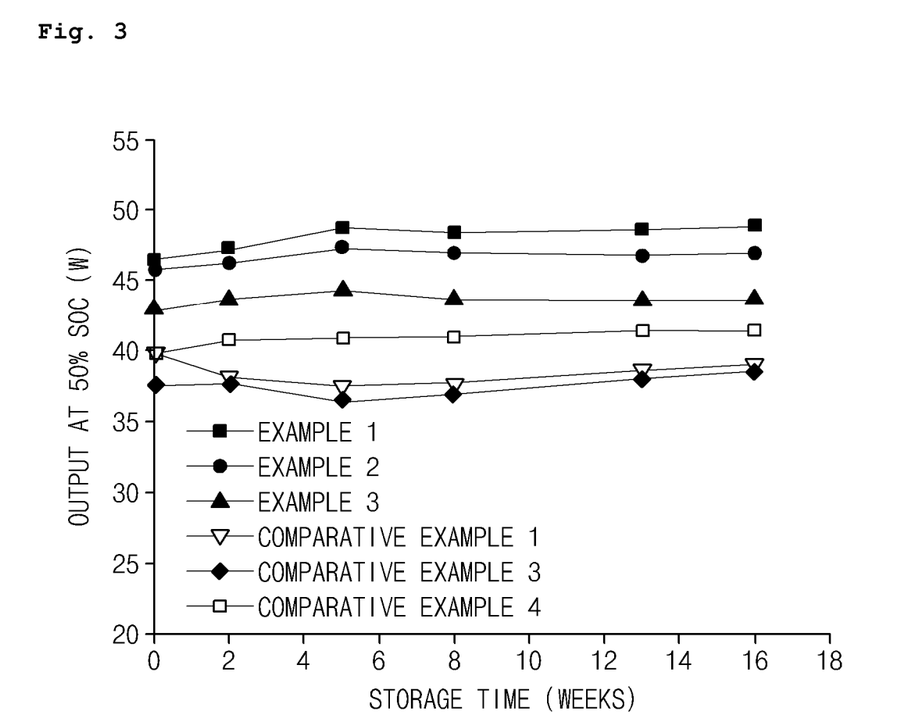
FIG. 3 is a graph illustrating the results of the measurement of output characteristics after high-temperature storage (60° C.) of lithium secondary batteries of Examples 1 to 3 and Comparative Examples 1, 3, and 4 according to Experimental Example 3.

Referring to FIG. 3, it may be understood that capacity retention ratios of the lithium secondary batteries of Examples 1 to 3 were significantly better than those of the lithium secondary batteries of Comparative Examples 1, 3, and 4 up to a storage time of 16 weeks.

In contrast, with respect to Comparative Example 4 having the molar ratio of 1:0.5 and Comparative Example 3 in which LiFSI was not used but LiPF$_6$ was used alone, capacity retention ratios at a storage time of 16 weeks were significantly decreased by 10% to 30% in comparison to those of Examples 1 and 2 of the present application.

Thus, the high-temperature storage characteristics of the lithium secondary battery may be improved by adjusting the molar ratio of LiPF$_6$ to LiFSI. In particular, it may be confirmed that the high-temperature storage characteristics of the lithium secondary batteries, in which the molar ratio of LiPF$_6$ to LiFSI was in a range of 1:6 to 1:9, were significantly better than those of the lithium secondary batteries in which the molar ratio was outside the above range.

Therefore, it may be confirmed that the output characteristics after high-temperature storage of the lithium secondary battery may be improved by adjusting the molar ratio of LiPF$_6$ to LiFSI.

Experimental Example 4

<Initial Room Temperature Output Characteristics Test

Figure 4A:
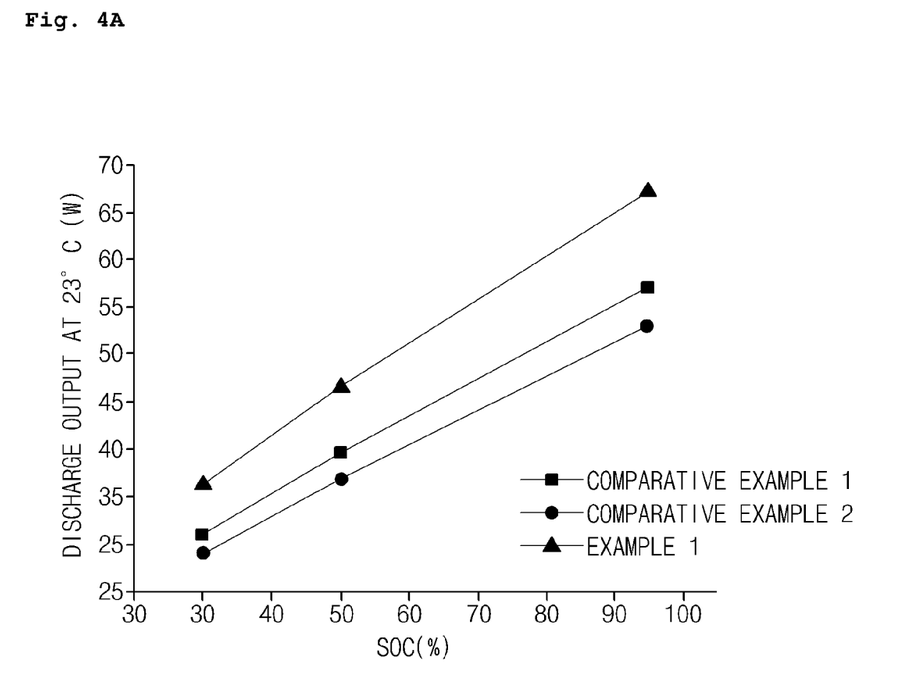
FIGS. 4A and 4B are graphs illustrating the results of the measurement of initial discharge output characteristics (FIG. 4A) and initial charge output characteristics (FIG. 4B) of lithium secondary batteries of Example 1 and Comparative Examples 1 and 2 according to the state of charge (SOC), according to Experimental Example 4.
Figure 4B:
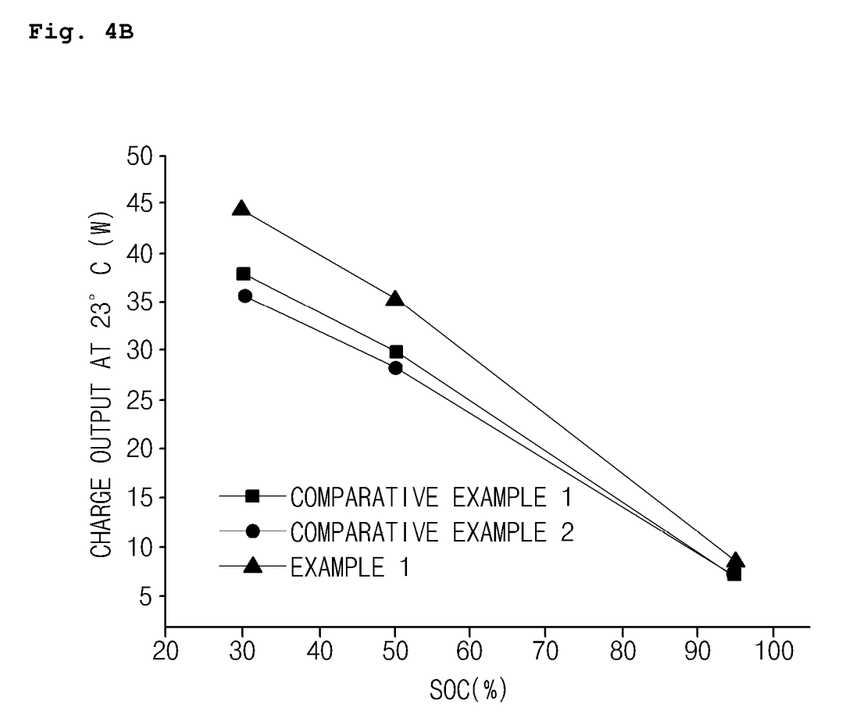

In order to evaluate output characteristics according to the type of an organic solvent, room temperature outputs were calculated from voltage differences which were obtained by discharging the lithium secondary batteries of Example 1 and Comparative Examples 1 and 2 at 0.5 C for 10 seconds for the state of charge (SOC) at 23° C. The results thereof are presented in FIGS. 4A and 4B. FIG. 4A illustrates results of discharge output (W) at 23° C. according to SOC (%), and FIG. 4B illustrates results of charge output (W) at 23° C. according to SOC (%).

Referring to FIG. 4A, the lithium secondary battery of Example 1 had better output characteristics than the lithium secondary batteries of Comparative Examples 1 and 2 from 30% SOC, and from 50% SOC, the output characteristics of the lithium battery of Example 1 began to exhibit a more significant difference from those of the lithium batteries of Comparative Examples 1 and 2. Also, in a case where the SOC was 90%, it may be understood that the lithium battery of Example 1 had room temperature discharge output characteristics that were improved about 1.2 to 1.4 times or more in comparison to those of the lithium secondary batteries of Comparative Examples 1 and 2. Similarly, when the results of charge output (W) at 23° C. according to SOC (%) of FIG. 4B were examined, a difference in output characteristics between Example 1 and Comparative Examples 1 and 2 was about 1.2 times or more at 30% SOC.

In particular, in a case where propylene carbonate and ester-based solvent (ethyl propionate) were not used as a non-aqueous organic solvent as in Comparative Example 2, it may be understood that the room temperature output characteristics were significantly decreased. In a case where propylene carbonate was used but an ester-based solvent (ethyl propionate) was not used as in Comparative Example 1, it may be understood that its output characteristics were increased in comparison to Comparative Example 2, but were significantly decreased in comparison to Example 1 in which propylene carbonate and ester-based solvent (ethyl propionate) were used in combination.

Therefore, it may be confirmed that the room temperature output characteristics were significantly improved by using lithium bis(fluorosulfonyl)imide in combination with a non-aqueous organic solvent including propylene carbonate and ethyl propionate as an ester-based solvent.

Experimental Example 5

<Capacity Characteristics Test After High-Temperature Storage>

The lithium secondary batteries of Example 1 and Comparative Examples 1 and 2 were charged at 1 C to 4.2 V/38 mA under a CC/CV condition, and then discharged at a CC of 1 C to a voltage of 3.0 V to measure discharge capacities. The results thereof are presented in FIG. 5.

Figure 5:
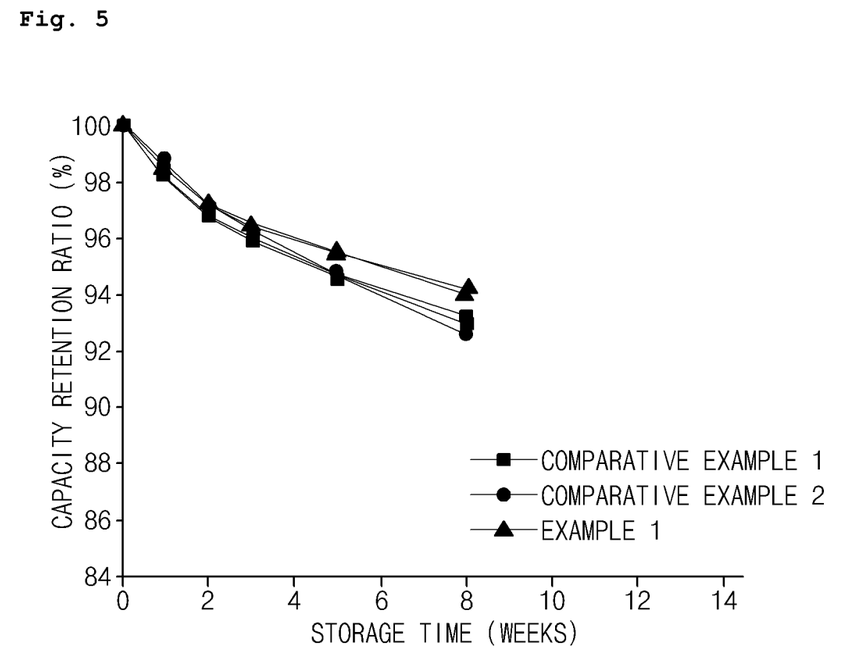
FIG. 5 is a graph illustrating the results of the measurement of capacity retention ratios (%) of lithium secondary batteries of Example 1 and Comparative Examples 1 and 2 according to storage time after high-temperature storage, according to Experimental Example 5.

Referring to FIG. 5, there was no difference between capacity retention ratio (%) of Example 1 and capacity retention ratios of Comparative Examples 1 and 2 up to the storage time of 8 weeks. However, with respect to the lithium secondary batteries of Comparative Examples 1 and 2 after the storage time of 3 weeks, the capacity retention ratios were rapidly decreased as the storage time increased. After the storage time of 5 weeks, it may be understood that the difference between the capacity retention ratio of Example 1 and the capacity retention ratios of Comparative Examples 1 and 2 was gradually increased.

Thus, it may be confirmed that the capacity characteristics after high-temperature storage of the lithium secondary battery of Example 1 was improved in comparison to those of the lithium secondary batteries of Comparative Examples 1 and 2.

Therefore, it may be confirmed that the capacity characteristics after high-temperature storage of the lithium secondary battery of Example 1, in which lithium bis(fluorosulfonyl)imide was used in combination with the non-aqueous organic solvent including propylene carbonate and ethyl propionate as an ester-based solvent, was improved in comparison to those of the lithium secondary batteries of Comparative Examples 1 and 2 having compositions different from that of Example 1.

INDUSTRIAL APPLICABILITY

According to a non-aqueous electrolyte solution of the present invention, since a robust SEI may be formed on an anode during initial charge of a lithium secondary battery including the non-aqueous electrolyte solution, high-temperature cycle characteristics and capacity characteristics after high-temperature storage as well as low-temperature, room temperature, and high-temperature output characteristics may be simultaneously improved. Therefore, the non-aqueous electrolyte solution may be suitable for secondary batteries.

The invention claimed is:
1. A non-aqueous electrolyte solution comprising:
   i) a non-aqueous organic solvent including propylene carbonate (PC) as a first solvent and an ester-based solvent as a second solvent;
   ii) a first lithium salt comprising lithium bis(fluorosulfonyl)imide (LiFSI); and
   iii) a second lithium salt,
   wherein an amount of the ester-based solvent is in a range of 10parts by weight to 70parts by weight based on 100parts by weight of the non-aqueous organic solvent, and wherein a mixing ratio of the propylene carbonate to the ester-based solvent is in a range of 1:0.5 to 1:4 as a weight ratio; and
   wherein the mixing ratio of the second lithium salt to the lithium bis(fluorosulfonyl)imide is in a range of 1:6 to 1:9 as a molar ratio.

2. The non-aqueous electrolyte solution of claim 1, the ester-based solvent comprises any one selected from the group consisting of methyl formate, methyl acetate, ethyl acetate, isopropyl acetate, isoamyl acetate, methyl propionate, ethyl propionate, methyl butylate, and ethyl butylate, or a mixture of two or more thereof.

3. The non-aqueous electrolyte solution of claim 2, wherein the ester-based solvent comprises methyl propionate, ethyl propionate, or a mixed solvent thereof.

4. The non-aqueous electrolyte solution of claim 1, wherein a concentration of the lithium bis(fluorosulfonyl) imide in the non-aqueous electrolyte solution is in a range of 0.1mole/l to 2mole/l.

5. The non-aqueous electrolyte solution of claim 1, wherein the amount of the ester-based solvent is in a range of 20parts by weight to 50parts by weight based on 100parts by weight of the non-aqueous organic solvent.

6. The non-aqueous electrolyte solution of claim 1, wherein the non-aqueous organic solvent further comprises any one selected from the group consisting of butylene carbonate (BC), dimethyl carbonate (DMC), diethyl carbonate (DEC), dipropyl carbonate (DPC), ethylmethyl carbonate (EMC), methylpropyl carbonate (MPC), and ethylpropyl carbonate (EPC), or a mixture of two or more thereof.

7. The non-aqueous electrolyte solution of claim 1, wherein the second lithium salt comprises any one selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, and $LiC_4BO_8$, or a mixture of two or more thereof.

8. The non-aqueous electrolyte solution of claim 1, further comprising at least one compound selected from the group consisting of $LiBF_4$, lithium oxalyldifluoroborate (LiODFB), and ethylene sulfate (ES).

9. The non-aqueous electrolyte solution of claim 1, further comprising two or more compounds selected from the group consisting of $LiBF_4$, LiODFB, and ES.

10. A lithium secondary battery comprising:
   a cathode;
   an anode;
   a separator disposed between the cathode and the anode; and
   the non-aqueous electrolyte solution of claim 1.

11. The non-aqueous electrolyte solution of claim 1, wherein the mixing ratio of the propylene carbonate to the ester-based solvent is in a range of 1:1to 1:2.5as a weight ratio.

12. A non-aqueous electrolyte solution comprising: i) a non-aqueous organic solvent including propylene carbonate (PC) as a first solvent and a ester-based solvent as a second solvent;
   ii) a first lithium salt comprising lithium bis (fluorosulfonyl)imide (LiFSI);
   iii) a second lithium salt, and
   iv) two or more compounds selected from the group consisting of $LiBF_4$, LiODFB, and ES;
   wherein the amount of the ester-based solvent is in a range of 10parts by weight to 70parts by weight based on 100parts by weight of the non-aqueous organic solvent, and a mixing ratio of the propylene carbonate to the ester-based solvent is in a range of 1:0.5to 1:4as a weight ratio; and
   wherein a mixing ratio of the second lithium salt to the first lithium salt is in a range of 1:1to 1:9as a molar ratio.

* * * * *